No. 884,924. PATENTED APR. 14, 1908.
C. V. HELMSCHMIED.
ILLUMINATED FLOWER POT.
APPLICATION FILED MAY 2, 1907. RENEWED FEB. 20, 1908.

2 SHEETS—SHEET 1.

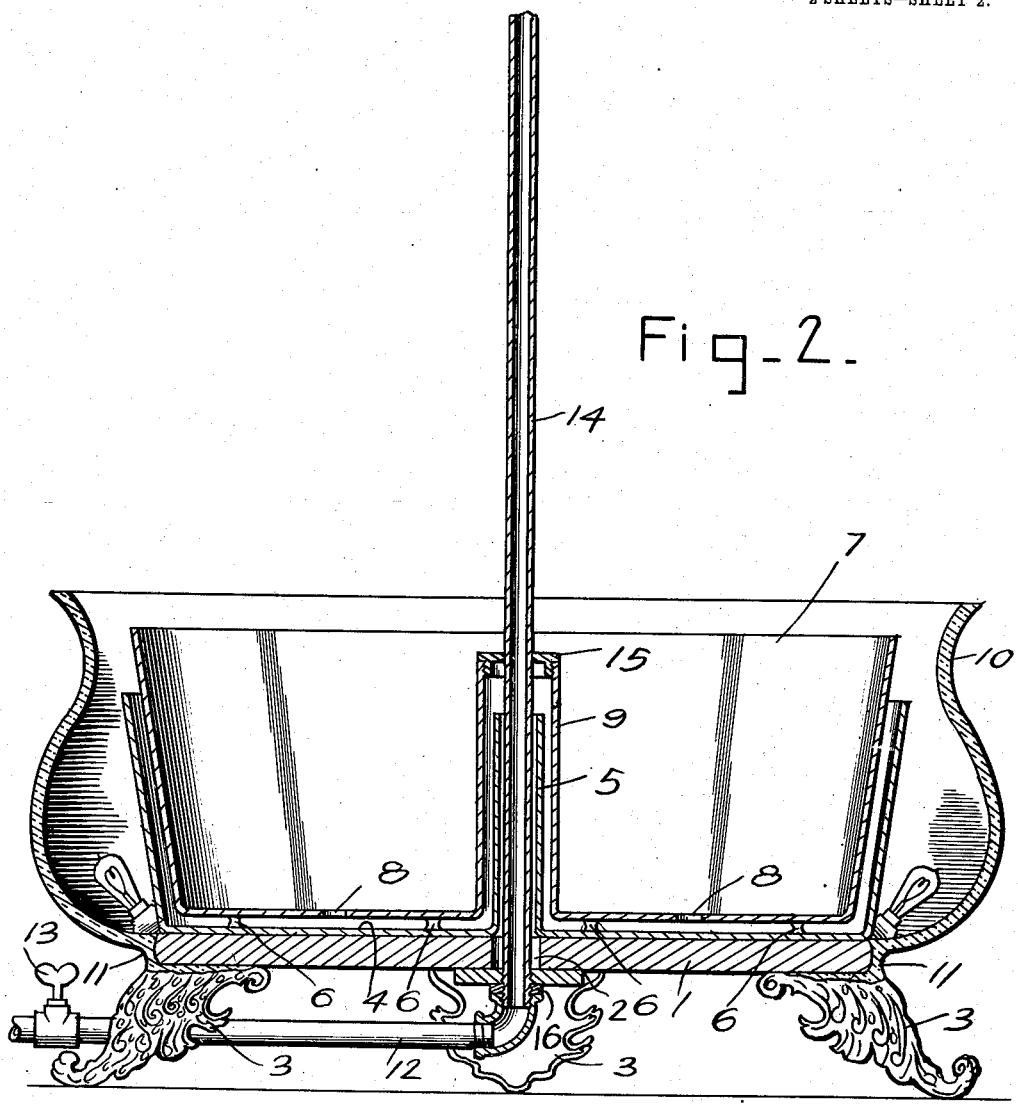

UNITED STATES PATENT OFFICE.

CARL V. HELMSCHMIED, OF MERIDEN, CONNECTICUT.

ILLUMINATED FLOWER-POT.

No. 884,924.    Specification of Letters Patent.    Patented April 14, 1908.

Application filed May 2, 1907, Serial No. 371,480.  Renewed February 20, 1908.  Serial No. 416,929.

*To all whom it may concern:*

Be it known that I, CARL V. HELMSCHMIED, a citizen of the United States, residing at Meriden, in the county of New Haven, State of Connecticut, have invented certain new and useful Improvements in Illuminated Flower-Pots; and I do hereby declare the following to be a full, clear, and exact description of the invention, such as will enable others skilled in the art to which it appertains to make and use the same.

This invention relates to new and useful improvements in illuminated flower pots, and it has particular reference to a flower pot having its parts constructed for use in connection with a pipe which may serve as a conductor for gas or oil or as a conduit for electricity, the said pipe being equipped at its upper end with a lighting device, either gas, oil or electric.

Figure 1:
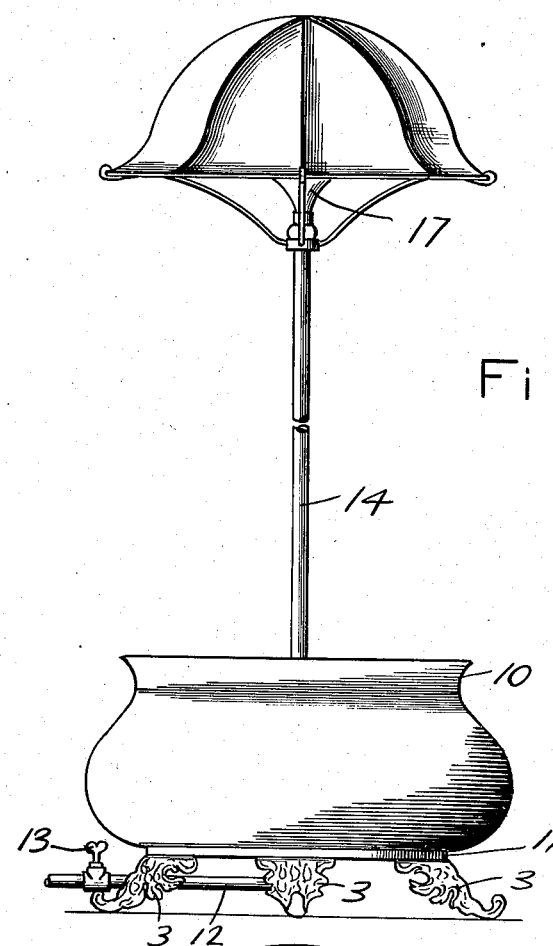
Figure 3:
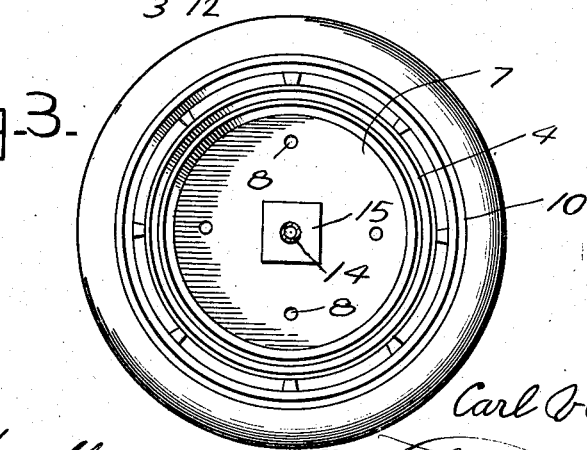

In connection with a flower pot of the above type, the invention aims as a primary object to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is an elevation of a flower pot constructed in accordance with the present invention. Fig. 2 is a enlarged vertical central section thereof. Fig. 3 is a plan view of the flower receptacle *per se*.

The invention in its practical embodiment includes a supporting base constituted of a round iron plate 1 having a central opening 2, the plate 1 resting upon legs 3. Imposed upon the plate 1 is a water receptacle 4 including an integral central open ended tubular portion 5 which communicates with the opening 2. The receptacle 4 is formed on the upper surface of its bottom with spacing lugs 6 which support the flower pot proper designated by the numeral 7 and illustrated more particularly in Fig. 2. By reason of the lug 6 the pot 7 is spaced away from the receptacle 4, in order to allow of the collection of moisture in said receptacle. The receptacle 7 is formed in its bottom with openings 8 through which the surplus moisture has egress. Said pot is also formed with an integral central tubular member 9 which surrounds the portion 5. The flower pot thus constructed has an ornamental outside shell, preferably of glass or other desirable vitreous material, this shell being designated by the numeral 10 and being formed at its lower edge with an annular bead 11 which engages the edge of the plate 1.

In connection with the flower pot a lighting conductor is employed which, as arbitrarily shown is adapted for gas or oil. Such conductor comprises a horizontal arm 12, having a controlling cock 13 and a vertical perpendicular arm 14 which is projected through the opening 2 and through the tubular portion 5, the arm 14 being held against play by nuts or washers 15 and 16 which are threaded thereupon and which bear respectively against the upper edge of the tubular portion 9, and the underneath surface of the plate 1. The arm 14 is equipped at its upper end with a gas or oil burner 17, which may be highly ornamental.

A flower pot constructed in accordance with the present invention is highly ornamental and makes an excellent display for show windows, fairs and the like and can be adapted for use with natural or artificial flowers without in any way altering the arrangement or structure of the parts.

From the foregoing description it will be seen that simple and efficient means are provided for accomplishing the objects of the present invention, but, while the elements herein shown and described are well adapted to serve the functions set forth, it is obvious that various minor changes may be made in the proportions, shape, and arrangement of the several parts without departing from the spirit and scope of the invention as defined in the appended claims.

What is claimed is:

1. A flower pot of the type set forth comprising a supporting plate having a central opening, a water receptacle imposed upon said plate and having a central tubular portion communicating with said opening, a flower pot imposed upon said water receptacle with its walls spaced therefrom and having openings in its bottom and a conductor projected through said opening and through said tubular portion.

2. A flower pot of the type set forth comprising a supporting plate having a central opening, a receptacle imposed upon said plate and having a central open ended tubular portion concentric to said opening, a conductor projected through said opening and said tubular portion, a lamp carried upon the upper end of said conductor and means for holding said conductor with relation to said tubular portion.

3. A flower pot of the type set forth, comprising a supporting plate having a central opening, a receptacle imposed upon said plate, and having a central open ended tubular portion concentric to said opening, a conductor projecting through said opening and through said tubular portion, said conductor being designed for use as a conduit for electric wires, or as a conductor for gas or as a conductor for oil, and an electric gas or oil lamp carried upon the upper end of said conductor.

In testimony whereof, I affix my signature, in presence of two witnesses.

CARL V. HELMSCHMIED.

Witnesses:
CORNELIUS J. DANAHER,
JACOB ZICK.